(12) United States Patent
Norhammar et al.

(10) Patent No.: US 7,907,638 B2
(45) Date of Patent: Mar. 15, 2011

(54) MEDIA STREAM MIXING

(75) Inventors: Björn Norhammar, Stocksund (SE);
Tobias Lindquist, Sundbyberg (SE)

(73) Assignee: Sony Ericsson Mobile Communications, AB, Lund (SE)

( * ) Notice: Subject to any disclaimer, the term of this patent is extended or adjusted under 35 U.S.C. 154(b) by 875 days.

(21) Appl. No.: 10/561,156

(22) PCT Filed: Jun. 9, 2004

(86) PCT No.: PCT/EP2004/006226
§ 371 (c)(1),
(2), (4) Date: Dec. 16, 2005

(87) PCT Pub. No.: WO2005/004450
PCT Pub. Date: Jan. 13, 2005

(65) Prior Publication Data
US 2006/0149399 A1 Jul. 6, 2006

Related U.S. Application Data

(60) Provisional application No. 60/480,874, filed on Jun. 24, 2003.

(30) Foreign Application Priority Data

Jun. 19, 2003 (EP) .................................. 03013877

(51) Int. Cl.
*H04J 1/02* (2006.01)
(52) U.S. Cl. ...................... 370/493; 370/537; 379/88.13
(58) Field of Classification Search .................. 370/487, 370/493, 494, 495, 535, 538
See application file for complete search history.

(56) References Cited

U.S. PATENT DOCUMENTS

| | | | | |
|---|---|---|---|---|
| 5,202,761 | A * | 4/1993 | Cooper | 348/515 |
| 5,351,090 | A * | 9/1994 | Nakamura | 348/484 |
| 5,387,943 | A * | 2/1995 | Silver | 348/512 |
| 5,430,496 | A * | 7/1995 | Silverbrook | 348/589 |
| 5,566,290 | A * | 10/1996 | Silverbrook | 345/473 |
| 5,570,372 | A * | 10/1996 | Shaffer | 370/468 |
| 5,617,539 | A * | 4/1997 | Ludwig et al. | 709/205 |
| 5,623,304 | A * | 4/1997 | Ota et al. | 348/143 |
| 5,689,641 | A * | 11/1997 | Ludwig et al. | 709/241 |
| 5,758,079 | A * | 5/1998 | Ludwig et al. | 709/204 |

(Continued)

FOREIGN PATENT DOCUMENTS

JP            09-247643         9/1997

(Continued)

OTHER PUBLICATIONS

International Search Report of PCT/EP2004/006226.

*Primary Examiner* — Ricky Ngo
*Assistant Examiner* — Ben H Liu
(74) *Attorney, Agent, or Firm* — Myers Bigel Sibley & Sajovec

(57) ABSTRACT

The present invention is directed towards a method and a portable communication device (200) for forming a real time output media stream by mixing a first real time media stream with a second media stream. Provision of mixing of media streams provides a number of attractive functions, for instance. This invention concerns how to increase the usage of a mobile VT application and how to be able to handle integrity issues when used in a portable communication device.

28 Claims, 2 Drawing Sheets

U.S. PATENT DOCUMENTS

| | | | |
|---|---|---|---|
| 5,822,542 A * | 10/1998 | Smith et al. | 709/247 |
| 5,915,091 A * | 6/1999 | Ludwig et al. | 709/204 |
| 5,936,945 A * | 8/1999 | Shibata et al. | 370/260 |
| 5,953,049 A | 9/1999 | Horn et al. | 348/14.09 |
| 5,991,313 A * | 11/1999 | Tanaka et al. | 370/537 |
| 6,032,130 A * | 2/2000 | Alloul et al. | 705/27 |
| 6,088,360 A * | 7/2000 | Amaral et al. | 370/412 |
| 6,160,570 A * | 12/2000 | Sitnik | 725/9 |
| 6,208,691 B1 * | 3/2001 | Balakrishnan et al. | 375/240.12 |
| 6,259,957 B1 * | 7/2001 | Alexander et al. | 700/94 |
| 6,337,867 B1 * | 1/2002 | Ejiri | 370/537 |
| 6,487,220 B2 * | 11/2002 | Matsuzaki et al. | 370/487 |
| 6,519,283 B1 * | 2/2003 | Cheney et al. | 375/240.01 |
| 6,529,231 B1 * | 3/2003 | Yoshida | 348/14.08 |
| 6,549,230 B2 * | 4/2003 | Tosaya | 348/14.08 |
| 6,778,493 B1 * | 8/2004 | Ishii | 370/229 |
| 6,810,035 B1 * | 10/2004 | Knuutila et al. | 370/354 |
| 6,825,873 B2 * | 11/2004 | Nakamura et al. | 348/14.02 |
| 6,853,385 B1 * | 2/2005 | MacInnis et al. | 345/629 |
| 6,853,398 B2 * | 2/2005 | Malzbender et al. | 348/14.09 |
| 6,906,741 B2 * | 6/2005 | Canova et al. | 348/14.08 |
| 6,912,544 B1 * | 6/2005 | Weiner | 707/104.1 |
| 6,987,767 B2 * | 1/2006 | Saito | 370/394 |
| 7,006,154 B2 * | 2/2006 | Dudkowski | 348/588 |
| 7,020,888 B2 * | 3/2006 | Reynolds et al. | 725/34 |
| 7,057,622 B2 * | 6/2006 | MacInnis et al. | 345/560 |
| 7,092,735 B2 * | 8/2006 | Osann, Jr. | 455/556.1 |
| 7,295,247 B2 * | 11/2007 | Bang | 348/515 |
| 7,443,447 B2 * | 10/2008 | Shirakawa | 348/376 |
| 2001/0048463 A1 | 12/2001 | Lunden | |
| 2002/0001309 A1 * | 1/2002 | Saito | 370/389 |
| 2002/0018117 A1 * | 2/2002 | Tosaya | 348/14.08 |
| 2002/0044572 A1 * | 4/2002 | Nakajima | 370/537 |
| 2002/0048361 A1 * | 4/2002 | Case et al. | 379/387.01 |
| 2002/0126226 A1 * | 9/2002 | Dudkowski | 348/722 |
| 2002/0180864 A1 * | 12/2002 | Nakamura et al. | 348/14.02 |
| 2002/0191072 A1 * | 12/2002 | Henrikson | 348/14.08 |
| 2005/0286431 A1 * | 12/2005 | Saito | 370/241 |
| 2007/0106726 A1 * | 5/2007 | Rosenberg | 709/204 |

FOREIGN PATENT DOCUMENTS

| | | |
|---|---|---|
| JP | 10-285457 | 10/1998 |
| JP | 2002-027136 | 1/2002 |
| JP | 2002-111998 | 4/2002 |
| JP | 2002-171530 | 6/2002 |
| JP | 2002-175069 | 6/2002 |
| JP | 2003-153079 | 5/2003 |
| WO | WO/01/31900 | 5/2001 |

* cited by examiner

MEDIA STREAM MIXING

RELATED APPLICATIONS

The present application is a 35 U.S.C. §371 national phase application of PCT International Application No. PCT/EP2004/006226, having an international filing date of Jun. 9, 2004 and claiming priority to European Patent Application No. 03013877.0, filed Jun. 19, 2003, and to United States Provisional Application No. 60/480,874 filed Jun. 24, 2003, the disclosures of which are incorporated herein by reference in their entireties. The above PCT International Application was published in the English language and has International Publication No. WO 2005/004450 A1.

TECHNICAL FIELD OF THE INVENTION

The present invention relates to real time mixing of at least two media streams in a portable communication device. More particularly, it relates to a method and a device for real time mixing of at least two media streams, for providing a real time transmitted output media stream.

DESCRIPTION OF RELATED ART

Most third generation mobile terminals will have a Video Telephony (VT) application implemented, which is based on the 3GPP specification 324M. This VT-application enables a person-to-person connection with communication including real-time voice and video information. These applications comprise recording and generating of one single video stream containing both audio and image information.

If it were possible to combine two different media streams in a portable communication device, a number of attractive functions could be provided such as exchanging voice from one stream with voice from another, replacing image information of one stream with image information of the other etc.

One interesting way of using VT would be to use so called "show and tell". This means that when playing a recorded video including audio and image information, voice (audio) is simultaneously added to this stream.

Furthermore, some consumers might be concerned about apparently being filmed at locations where it may be inappropriate or where the other party is not allowed to see the location because of security reasons. The apparent real time movie may for instance be a combination of two different movies, one of which shows the location and the other shows the consumer.

This invention concerns how to increase the usage of a mobile VT application and how to be able to handle integrity issues when used in a video phone.

There is thus a need for a method and a device that can provide an output media stream that is based on two separate input streams, where at least one is a real-time stream.

SUMMARY OF INVENTION

This invention is thus directed towards solving the problem of providing a real time synchronized output media stream being transmitted from a portable communication device, where said output media stream is a mixture of a first (real time) media stream and a second media stream.

This is achieved by providing generating in real time a first media stream in the portable communication device, and combining in real time the first media stream with a second media stream, for forming the output media stream.

One object of the present invention is to provide a method for forming a real time output media stream made up of a first real-time media stream and a second media stream.

According to a first aspect of this invention, this object is achieved by a method for forming an output media stream to be transmitted during a communication session from a portable communication device, wherein said media stream comprises signals of a first type, comprising the steps of:
 generating in real time a first media stream in the portable communication device, and
 combining in real time the first media stream with a second media stream, for forming the output media stream.

A second aspect of the present invention is directed towards a method including the features of the first aspect, wherein said output media stream comprises signals of a second type.

A third aspect of the present invention is directed towards a method including the features of the first aspect, further comprising the step of transmitting said output media stream.

A fourth aspect of the present invention is directed towards a method including the features of the first aspect, further comprising the step of establishing a connection with another device.

A fifth aspect of the present invention is directed towards a method including the features of the fourth aspect, wherein said connection is a circuit-switched connection.

A sixth aspect of the present invention is directed towards a method including the features of the first aspect, in which at least one of the steps is dependent on input data from a user of said portable communication device.

A seventh aspect of the present invention is directed towards a method including the features of the first aspect, wherein the step of combining comprises combining signals of a first type from the first media stream with signals of a second type from the second media stream.

An eighth aspect of the present invention is directed towards a method including the features of the first aspect, wherein the step of combining comprises combining signals of a first type from the first media stream with signals of the first type from the second media stream.

A ninth aspect of the present invention is directed towards a method including the features of the eighth aspect, wherein the step of combining further comprises combining signals of a second type from the first media stream with the signals from the second media stream.

A tenth aspect of the present invention is directed towards a method including the features of the eighth aspect, wherein the step of combining further comprises combining signals from the first media stream with signals of the second type from the second media stream.

An eleventh aspect of the present invention is directed towards a method including the features of the tenth aspect, wherein the step of combining further comprises combining signals of the second type from the first media stream with signals from the second media stream.

A twelfth aspect of the present invention is directed towards a method including the features of the eleventh aspect, wherein the step of combining further comprises the step of:
 delaying, prior to combining, signals of one type of the second media stream, in relation to the other type of signals of the same stream, for providing synchronized signals from the second media stream within the output media stream.

A thirteenth aspect of the present invention is directed towards a method including the features of the tenth aspect, wherein the step of combining further comprises independently combining signals of the first type and signals of the second type.

A fourteenth aspect of the present invention is directed towards a method including the features of the ninth aspect or the eleventh aspect, wherein the step of combining further comprises delaying signals of one type within the output media stream, in relation to the other type of signals of the same stream, for providing synchronized signals from the first media stream within the output media stream.

A fifteenth aspect of the present invention is directed towards a method including the features of the ninth aspect, wherein the step of combining signals, where the signals of the first type are audio signals, further comprises the step of superposing the signals of said first type.

A sixteenth aspect of the present invention is directed towards a method including the features of the fifteenth aspect, wherein the step of superposing comprises weighting properties of the audio signals from the first media stream and the second media stream.

A seventeenth aspect of the present invention is directed towards a method including the features of the ninth aspect, wherein the step of combining signals, where the signals of the first type are image signals, further comprises the step of blending the signals of the first type.

An eighteenth aspect of the present invention is directed towards a method including the features of the seventeenth aspect, wherein the step of blending comprises weighting properties of the image signals from the first media stream and the second media stream.

A nineteenth aspect of the present invention is directed towards a method including the features of the sixteenth aspect, wherein weighting properties includes varying the proportion of signals from the first media stream in relation to the proportion of signals from the second media stream.

A twentieth aspect of the present invention is directed towards a method including the features of the nineteenth aspect, wherein the weighting properties is dependent on input data of a user of said portable communication device.

A twenty-first aspect of the present invention is directed towards a method including the features of the nineteenth aspect, wherein the varying said proportions comprises varying of each proportion within the range between 0 and 100%.

Another object of the present invention is to provide a portable communication device for forming a real time output media stream made up of a first real time media stream and a second media stream.

According to a twenty-second aspect of the present invention, this object is achieved by a portable communication device for forming an output media stream to be transmitted during a communication session from said portable communication device, wherein said output media stream comprises signals of a first type, said portable communication device comprising:
  a generating unit provided for generating a first media stream in real time,
  a first combining unit, connected to said generating unit, provided for combining in real time the first media stream with a second media stream, and
  a control unit controlling the generating unit and the combining unit.

A twenty-third aspect of the present invention is directed towards a portable communication device including the features of the twenty-second aspect, for forming an output media stream to be transmitted during a communication session from said portable communication device, wherein the first combining unit is provided for combining signals of the first type, of both the first and second media streams, wherein the output media stream comprises signals of the first type and a second type, further comprises:
  a second combining unit, for combining signals of the second type of the first media stream and signals of the second type of the second media stream for providing the output media stream comprising signals of both the first and second type.

A twenty-fourth aspect of the present invention is directed towards a portable communication device including the features of the twenty-second aspect, further comprising:
  a memory unit for providing storage for the second media stream.

A twenty-fifth aspect of the present invention is directed towards a portable communication device including the features of the twenty-second aspect, further comprising:
  a user input interface for providing user input and connected to the control unit so that the generating unit and all combining units are controlled in dependence of user input.

A twenty-sixth aspect of the present invention is directed towards a portable communication device including the features of the twenty-third aspect, further comprising:
  a multiplexing unit (220) for providing synchronization of signals of one type from the first media stream in relation to signals of the other type from same first media stream, within the output media stream.

A twenty-seventh aspect of the present invention is directed towards a portable communication device including the features of the twenty-third aspect, further comprising further comprising:
  a delaying unit for providing synchronized signals within the output media stream.

A twenty-eighth aspect of the present invention is directed towards a portable communication device including the features of the twenty-seventh aspect, where the delaying unit provides synchronization of signals from the second media stream, prior to combining with the first stream.

A twenty-ninth aspect of the present invention is directed towards a portable communication device including the features of the twenty-eighth aspect, where the delaying unit provides synchronization of signals of one type in relation to signals of the other type from the same second media stream.

The present invention provides an output media stream where a first real-time media stream is combined with a second media stream. This has the advantage that the two media streams can be combined in a number of ways for providing a number of different attractive functions for example.

A user of a mobile device can, instead of separately sending video camera images to a communicating party, transmit a pre-recorded video or sound, while mixing said pre-recorded video with real time voice or audio information in order to provide the communicating party the perception that the user is located at another place than he actually is. Such an effect can further be enhanced by mixing moving image information, such as the face of the user, into said pre-recorded video.

Upon receiving a video phone call the user can, instead of sending real time video camera images from his camera to the calling, decide to play a pre-recorded video answering message, containing moving or still pictures, stored in memory, in order to provide a mobile video answering machine.

During a conversation a user of the communication device can share content information such as video or still images instantly by providing It in the output media stream of a Vr-session. This can thus be used for allowing for simultaneous multimedia.

Another example is the use of sending of a pre-recorded video file during start up of a VT session, where said file can contain advertisements, qualifying for reduced communication tariffs.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF THE EMBODIMENTS

The present invention relates to the forming a synchronized output media stream to be transmitted during a communication session from a portable communication device.

The features according to this preferred embodiment will be available in the 3G-324M application of communication devices. In order to achieve this the flexibility of the H.245 protocol will be utilized together with updated SW/HW architecture.

Figure 1:
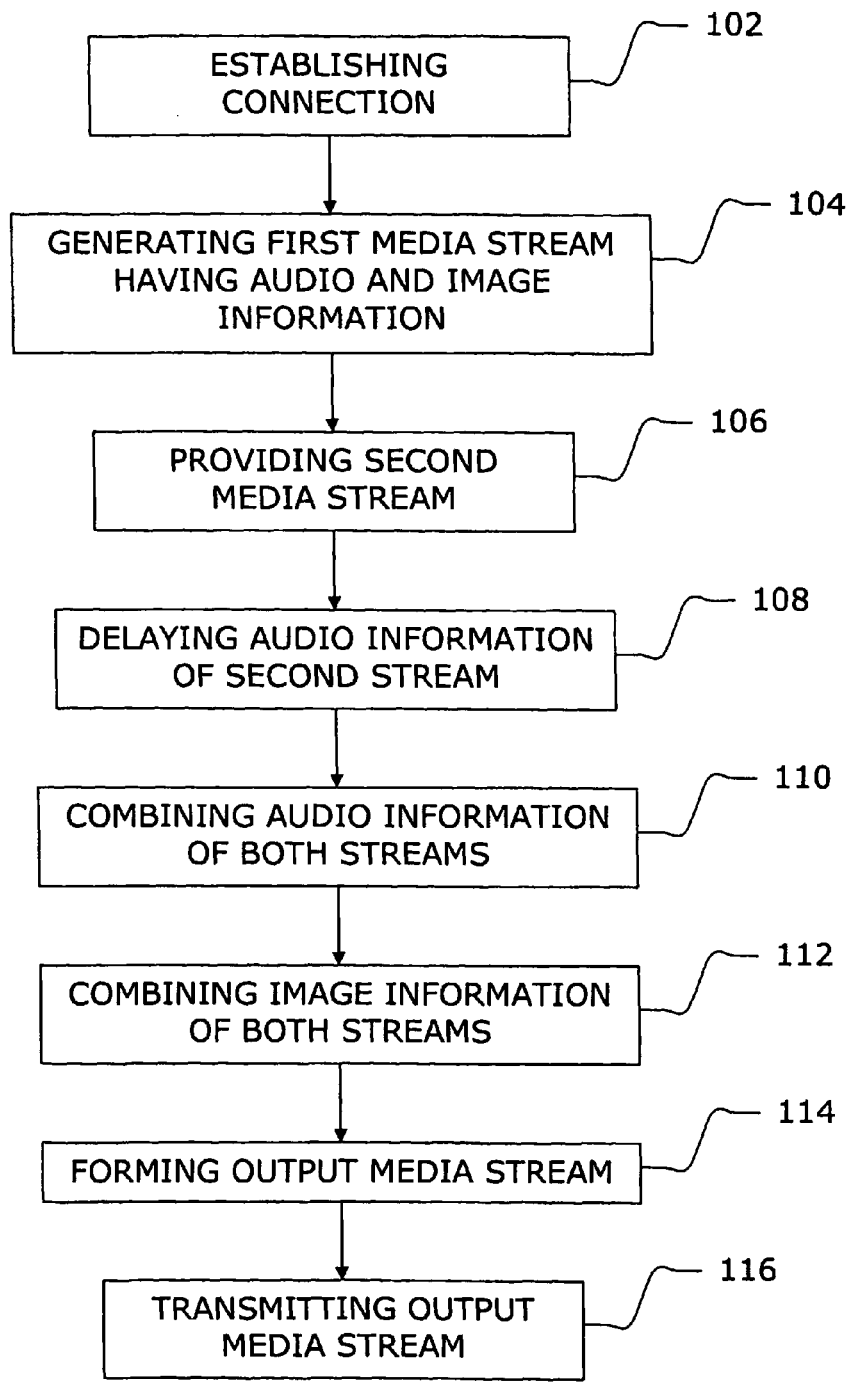
FIG. 1 shows a method for providing in real time a synchronized output media stream that is transmitted from a portable communication device, where said output media stream is a mixture of a first real time media stream and a second media stream.
Figure 2:
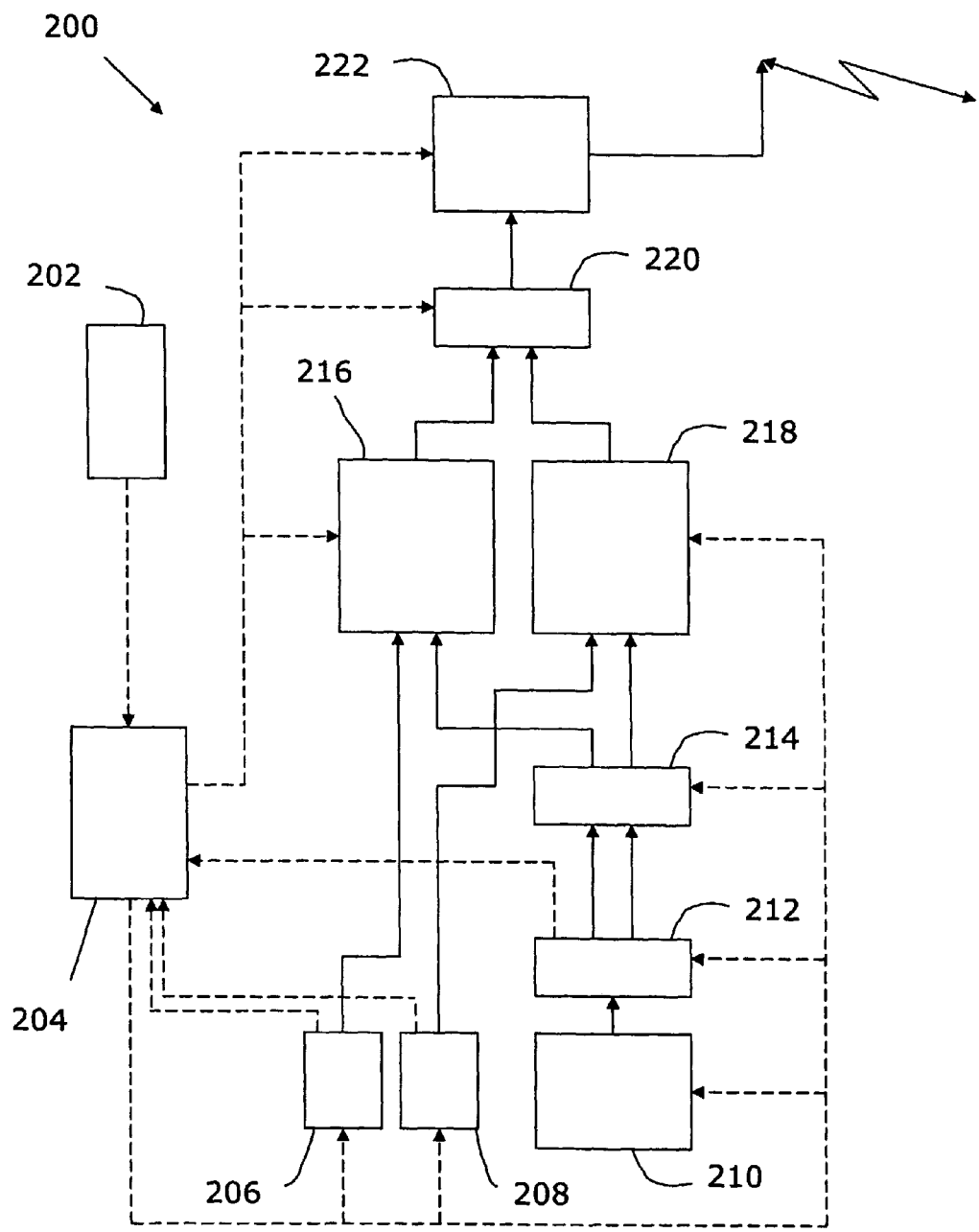
FIG. 2 illustrates a portable communication device for providing the synchronized output media stream that is generated according to the method in FIG. 1

Reference will now be given to FIGS. 1 and 2, illustrating a method for providing a synchronized output media stream in real time that is transmitted from a portable communication device and a portable communication device according to the present invention, respectively.

According to this preferred embodiment said method starts by establishing a connection, step 102, between the portable communication device 200 and another communication device, with which the user of the portable communication device would like to establish a VT communication session. This is done through the user selecting a VT-session via a user input interface 202, based on the selection a control unit 204 makes a transmitting unit 222 set up a VT-session with another device. Generating of the first media stream having both audio and image information, i.e. signals of a first and second type, step 104, is then performed by an audio generating unit 206 and an image generating unit 208 both controlled by the control unit 204. This is done through recording image via camera comprised in the image generating unit 208 and audios via a microphone comprised within the audio generating unit 206.

According to this embodiment the first media stream comprises both audio and image information. Now, providing of the second media stream, step 106, is performed by obtaining said media stream from a memory unit 210. Also this is done through the control of the control unit depending on user input. This memory unit is in this preferred embodiment an internal memory comprised included in the portable communication device, 200. As the second media stream contains multiplexed audio and image information, this stream is demultiplexed to separate these two types of signals. This is performed in a demultiplexing unit 212. The demultiplexing unit 212, performs decoding of image formats in order to obtain a format that is suitable for mixing according to this preferred embodiment. A suitable format is for instance the YUV format. This demultiplexing unit 212 further decodes the audio information to a suitable format. This audio format is for example the PCM format The demultiplexing unit 212 further has a bit-rate converting capability, for converting the bit-rate of audio and/or image information to facilitate the steps of combining information of the same type in combining units 216 and 218. The first and second media streams now contain decoded separated types of signals, containing audio and image information respectively.

The above mentioned demultiplexing and decoding of the different signal types, according to the present invention, consumes different amounts of time. In this preferred embodiment the image processing path requires more time than the audio processing path, which is the general case. For obtaining a subsequent output media stream comprising synchronized audio and image information from the second stream, audio information from this second stream is subjected to delaying, step 108, by a delaying unit 214. The amount of delay used is further determined by the control unit, based on the difference in time of the different processing steps. However, the amount of delay used is also dependent on any time difference between audio and image information of the first media stream. The delaying unit 214, effective on the second media stream, hence also has to compensate for a portion of subsequent synchronizing by a multiplexing unit 220, effective on the output media stream, which portion is due to any timing difference between audio and image information within the first media stream.

The separated types of information, i.e. audio and image are now subjected to combining. Audio information from both streams are combined, step 110, by a first combining unit 216. A second combining unit 218 is similarly combining image information from both streams, step 112. The combining of audio information is performed by superposing audio information of the first stream on audio information of the second stream. This combining further includes weighting the properties of the audio information from the first stream and the audio information from the second stream. This encompasses varying the proportion of audio information from one stream in relation to the proportion of audio information from the other stream.

According to this preferred embodiment of the present invention the first combining unit 216 includes coding of the combined audio information to a suitable format such as AMR.

For image information the combining unit 218 combines image information from the first stream with image information from the second stream by a process called a-blending, which is well known to a person skilled in the art and will therefore not be further discussed here. This combining of image information however includes weighting properties of the image information from the first stream and the second stream. Similar to the combing of audio information by the first combining unit 216 the weighting properties within the second combining unit 218 includes varying the proportions of image information from one stream in relation to the proportion of image information from the other stream.

Weighting properties of audio and image information is dependent on user input data obtained from the user via the user input interface 202.

Moreover, according to said preferred embodiment the second combining unit 218, comprises coding the combined image information to a suitable format, such as MPEG-4.

The steps of combining information of the same type, from the two different streams, is now followed by forming the output media stream, step 114, by the multiplexing unit 220.

This multiplexing unit 220 further contains synchronizing capabilities in order to achieve internal synchronizing between the two types of information from the first media stream, i.e. to synchronize the audio with the image information from this stream. This synchronizing takes into consideration any time difference between the audio information and the image information within the first stream. However, it also respects any time difference between the time required for audio information to pass the combining unit, on the one hand, and the time required for image information to pass the combining unit, on the other hand. These required durations will typically depend on the presence of audio and/or image information in the media streams being combined.

Upon having formed the output media stream including information from the first media stream and synchronized information of the second stream, this combined multiplexed output stream is subjected to real time transmitting, step 116, by the transmitting unit 222.

With reference to portable communication device as shown in FIG. 2, it is seen that the control unit 204 is connected to all the other performing units, in order to control them, upon receiving user input data via the user input data interface 202. The step of generating the first media stream, step 104, providing the second media stream, step 106 and the steps of combining audio information, step 110, and combining image information, step 112, require user input data.

Furthermore, in order to delay the correct type of information, either audio or image information, feedback signaling is included between the second combing unit 212 and the control unit 204 to adjust the delay subject to the correct type of information in the delaying unit 214.

The invention can be varied in many ways for instance:

The first media stream can comprise only image information, only audio information or a combination of both. Also the second media stream can comprise only image information, only audio information or a combination of both. All these different variations of the first and second media streams can be combined. The memory unit can be either fixed in the device or be an easily replaceable unit, such as a memory stick or another memory unit that is connectable to or insertable in the portable communication device.

Image information can furthermore be provided within the first or second stream, as moving pictures, or a combination of both still pictures and moving pictures.

Processing of audio information from the second media stream can be more time consuming than processing of image information from the same stream, which means that image information of the second stream needs to be delayed in relation to the audio information, in order to obtain an output media stream containing synchronized information.

The second media stream may furthermore contain audio and image information coded by using any of a large number of different codes. The first and second combining units may furthermore have coding capabilities to encode the superposed audio information and the blended image information in a large number of different formats.

According to another embodiment, the first media stream is provided as a single multiplexed first media stream from a single media stream generating unit. In this case, an additional unit, a demultiplexing unit, is needed to demultiplex this multiplexed media stream, prior to the steps of combining audio information and image information separately.

Another possible variation is to execute the steps according to the method in a different order.

It is furthermore possible to form an output media stream from more than two media streams, as well as to form an output media stream having information of more than two different types. It is furthermore possible form an output media stream by combining information from multimedia streams.

According to yet another embodiment of the present invention a first and a second real time media stream are combined. In this case the second media stream is provided to the portable communication device in real time. One example of this embodiment is combining one real time media stream from a camera mounted for instance on the front of a portable device with another real time media stream from a camera mounted for instance on the back side of the same portable device. Holding the portable device in one's hand with a stretched out arm standing for instance in front of a sight-seeing spot, with the two cameras directed in different or opposite directions, enables one to combine the media stream containing audio an image information, of oneself with the second stream containing audio and image of one's current location, i.e. the sightseeing spot. It is thus easy and convenient to include oneself in a real time stream containing audio and image information, without the need of finding a second person for assistance.

With the present invention has thus been described a method and a device for forming a real time output media stream by mixing a first media stream with a second media stream.

The provision of mixing of media streams provides a number of attractive functions, for instance.

A user of a mobile device can, instead of separately sending video camera images to a communicating party, transmit a pre-recorded video or sound while mixing said pre-recorded video with voice or audio information. As this mixing is performed in real time "on the fly" the receiving party might get the impression that the user is in another location than he actually is, like for instance on a luxurious vacation resort.

This effect can be furthermore enhanced by mixing moving image information, such as the face of the user, into said pre-recorded video.

This is also applicable in other situations, when for instance the communicating party is not allowed to see the location for security reasons.

Upon receiving a video phone call the user can, instead of sending real time video camera images from his camera to the calling party, decide to play a pre-recorded video answering message, containing moving or still pictures, stored in memory. This feature can thus used as a mobile video answering machine. This can be useful since the user may not want to turn on his live video camera, when answering a VT call but still have the possibility of receiving pictures from a calling party.

During a conversation a user of the communication device can share content information such as video or still images instantly as a bearer for exchanging media files, allowing for simultaneous multimedia.

Sending of a pre-recorded video file during start up of a VT session, where said file can contain advertisements, qualifying for reduced communication tariffs.

The invention claimed is:

1. A method of forming an output media stream to be transmitted during a communication session from a portable communication device wherein said output media stream comprises signals of a first media type, the method comprising:

generating in real time a first media stream in the portable communication device, combining in real time the first media stream with a second media stream to form the output media stream wherein combining comprises superposing, within the portable communication device, signals of the first media type from the first media stream on signals of the first media type from the second media stream to produce the output media stream, wherein the output media stream comprises portions of the first and second media streams which are configured to be presented in a substantially simultaneous time period, and transmitting said output media stream, wherein the communication session includes a video telephony session, wherein the second media stream includes a prerecorded media stream that is user selectable, and wherein at least one of generating and/or combining is dependent on input data from a user of said portable communication device.

2. Method according to claim 1, wherein said output media stream comprises signals of a second media type.

3. Method according to claim 1, further comprising: establishing a connection with another device.

4. Method according to claim 3, wherein said connection is a circuit-switched connection.

5. Method according to claim 1, wherein combining comprises combining signals of the first media type from the first media stream with signals of a second media type from the second media stream.

6. Method according to claim 1, wherein combining further comprises combining signals of a second media type from the first media stream with the signals from the second media stream.

7. Method according to claim 1, wherein combining further comprises combining signals from the first media stream with signals of the second media type from the second media stream.

8. Method according to claim 7, wherein combining further comprises combining signals of the second media type from the first media stream with signals from the second media stream.

9. Method according to claim 8, wherein combining further comprises:

delaying, prior to combining, signals of one media type of the second media stream in relation to the other media type of signals of the same stream to provide synchronized signals from the second media stream within the output media stream.

10. Method according to claim 7, wherein combining further comprises independently combining signals of the first media type and signals of the second media type.

11. Method according to claim 6, wherein combining further comprises delaying signals of one media type within the output media stream, in relation to the other media type of signals of the same stream to provide synchronized signals from the first media stream within the output media stream.

12. Method according to claim 1, wherein the signals of the first media type are audio signals so that the signals of the first media type from the first media stream comprise first audio signals and the signals of the first media type from the second media stream comprise second audio signals, wherein combining further comprises superposing the first and second audio signals of the first and second media streams.

13. Method according to claim 12, wherein superposing comprises weighting properties of the audio signals from the first media stream and the second media stream.

14. Method according to claim 1, wherein the signals of the first media type are image signals so that the signals of the first media type from the first media stream comprise first image signals and the signals of the first media type from the second media stream comprise second image signals, wherein combining further comprises blending the first and second image signals of the first and second media streams.

15. Method according to claim 14, wherein blending comprises weighting properties of the image signals from the first media stream and the second media stream.

16. Method according to claim 13, wherein weighting properties includes varying the proportion of signals from the first media stream in relation to the proportion of signals from the second media stream.

17. Method according to claim 16, wherein weighting properties is dependent on input data of a user of said portable communication device.

18. Method according to claim 16, wherein varying said proportions comprises varying of each proportion within the range between 0 and 100%.

19. Portable communication device configured to form an output media stream to be transmitted during a communication session from said portable communication device, wherein said output media stream comprises signals of a first media type, said portable communication device comprising:

at least one generating unit configured to generate a first media stream, a first combining unit, connected to said generating unit, wherein the first combining unit is configured to combine in real time the first media stream with a second media stream and wherein the first combining unit is configured to superpose, within the portable communication device, signals of the first media type from the first media stream on signals of the first media type from the second media stream to form the output media stream, wherein the output media stream comprises portions of the first and second media streams which are configured to be presented in a substantially simultaneous time period, a control unit configured to control the generating unit and the combining unit, in dependence of user input, and a transmitter configured to transmit said output media stream, wherein the communication session includes a video telephony session, wherein the second media stream includes a prerecorded media stream that is user selectable, and wherein at least one of the generating unit and/or the combining unit is configured to function in response to input data from a user of said portable communication device.

20. Portable communication device according to claim 19 configured to form an output media stream to be transmitted during a communication session from said portable communication device, wherein the first combining unit is configured to combine signals of the first media type of both the first and the second media streams, wherein the output media stream comprises signals of the first media type and a second media type, wherein the portable device further comprises:

a second combining unit configured to combine signals of the second media type of the first media stream and signals of the second media type of the second media stream by using the second combining unit.

21. Portable communication device according to claim 19, further comprising:

a memory unit configured to provide storage for the second media stream.

22. Portable communication device according to claim 19, further comprising:

a user input interface configured to provide user input.

23. Portable communication device according to claim 20, wherein said device further comprises:
   a multiplexing unit configured to provide synchronization of signals of one media type from the first media stream in relation to signals of the other media type from the same first media stream, within the output media stream.

24. Portable communication device according to claim 20, further comprising:
   a delaying unit configured to provide synchronized signals within the output media stream.

25. Portable communication device according to claim 24, where the delaying unit provides synchronization of signals from the second media stream, prior to combining with the first stream.

26. Portable communication device according to claim 25, where the delaying unit provides synchronization of signals of one media type in relation to signals of the other media type from the same second media stream.

27. A Method according to claim 1, wherein generating the first media stream comprises generating real time image signals from a first camera in the portable communication device, further comprising generating the second media stream by generating real time image signals from a second camera in the portable communication device, wherein the first camera is arranged to capture image signals in a first direction and the second camera is arranged to capture image signals in a second direction that is different from the first direction.

28. A portable communication device according to claim 19, wherein the a least one generating unit comprises a first generating unit that is configured to generate the first media stream that includes a first image signal corresponding to a first direction from the portable communication device, further comprising a second generating unit that is configured to generate the second media stream that includes a second image signal corresponding to a second direction from the portable communication device that is different from the first direction.

* * * * *